United States Patent
Kooiman et al.

(10) Patent No.: US 11,712,871 B2
(45) Date of Patent: Aug. 1, 2023

(54) LARGE CELL CARBON CORE SANDWICH PANEL AND METHOD OF MANUFACTURING SAME

(71) Applicant: Textron Innovations Inc., Providence, RI (US)

(72) Inventors: James Everett Kooiman, Fort Worth, TX (US); David Carlson, North Richland Hills, TX (US); Douglas K. Wolfe, Denton, TX (US); Jonathan Alexander Freeman, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 213 days.

(21) Appl. No.: 17/109,076

(22) Filed: Dec. 1, 2020

(65) Prior Publication Data
US 2021/0162698 A1 Jun. 3, 2021

Related U.S. Application Data

(62) Division of application No. 15/878,301, filed on Jan. 23, 2018, now Pat. No. 10,850,474.

(51) Int. Cl.
*B32B 3/26* (2006.01)
*B32B 3/12* (2006.01)
*B64C 3/26* (2006.01)
*B32B 37/10* (2006.01)
*B32B 27/06* (2006.01)
(Continued)

(52) U.S. Cl.
CPC ............ *B32B 3/266* (2013.01); *B29C 70/342* (2013.01); *B32B 3/12* (2013.01); *B32B 27/06* (2013.01); *B32B 37/1009* (2013.01); *B64C 3/26* (2013.01); *B32B 37/1018* (2013.01); *B32B 37/146* (2013.01); *B32B 2038/0076* (2013.01); *B32B 2605/18* (2013.01)

(58) Field of Classification Search
CPC ........... B32B 3/266; B32B 3/12; B32B 27/06; B32B 2605/18; B64C 3/26
USPC ................................ 428/116, 118; 156/285
See application file for complete search history.

(56) References Cited

U.S. PATENT DOCUMENTS

| | | | |
|---|---|---|---|
| 5,589,016 A * | 12/1996 | Hoopingarner | B32B 5/22 428/116 |
| 2005/0025929 A1 * | 2/2005 | Smith | B32B 3/12 428/118 |
| 2009/0072441 A1 * | 3/2009 | Bracke | B31D 3/0284 264/271.1 |

OTHER PUBLICATIONS

Karlsson "Manufacturing and applications of structural sandwich components" Composites Part A 28A pp. 97-111 (Year: 1997).*
(Continued)

*Primary Examiner* — Tri V Nguyen
(74) *Attorney, Agent, or Firm* — Lightfoot & Alford PLLC (57) ABSTRACT

A method of fabricating a panel includes laying up a first laminate on a tooling surface, laying a first layer of thermoplastic on an inner surface of the first laminate, laying a large cell carbon core on the first layer of thermoplastic, laying a second layer of thermoplastic across the large cell carbon core, laying a second laminate on the second layer of thermoplastic, creating a sealed core pocket by bonding the edges of the first and second layers of the thermoplastic surrounding a perimeter of the core, increasing pressure within the core pocket, increasing pressure on the outer surface of the second laminate, heating the panel to a desired curing temperature, and maintaining the increased pressures and temperature for a desired curing duration.

7 Claims, 7 Drawing Sheets

(51) Int. Cl.
   *B29C 70/34*   (2006.01)
   *B32B 38/00*   (2006.01)
   *B32B 37/14*   (2006.01)

(56) References Cited

OTHER PUBLICATIONS

Ma "Experimental investigation of composite pyramidal truss core sandwich panels with lightweight inserts" Composite Structures 187 (2018) 336-343 (Year: 2018).*

* cited by examiner

LARGE CELL CARBON CORE SANDWICH PANEL AND METHOD OF MANUFACTURING SAME

CROSS-REFERENCE TO RELATED APPLICATIONS

This is a divisional application of application Ser. No. 15/878,301, which was filed on 23 Jan. 2018 and entitled "LARGE CELL CARBON CORE SANDWICH PANEL AND METHOD OF MANUFACTURING SAME," the entire content of which is hereby expressly incorporated by reference.

BACKGROUND

In many applications, particularly in the aerospace industry, there is a large demand for thin, strong, lightweight panels, for example, wing skins on aircraft. Wing skins used to be made of thin lightweight aluminum panels and a network of internal structures of the wing carried most of the loads. Later, wing skins were made of carbon fiber sheets with stringers bonded to them to have the skins carry a larger portion of the load. More recently, large cell carbon core technology has enabled aircraft manufacturers to eliminate the stringers in favor of a smooth inner surface of the skins, while improving the structural integrity. As such, the large cell carbon core skins function not just as airfoils, but as structural components of the wing. The smooth inner surface of the panels also significantly simplify fabrication of the panels, and make attachment of internal structures thereto much simpler.

Similar to traditional honeycomb sandwich panels, large cell carbon core panels include a pair of laminates bonded to a honeycomb shaped core. However, traditional honeycomb panels are manufactured in a single curing process. That is, when manufacturing a traditional honeycomb sandwich panel, an uncured first laminate, a first layer of adhesive, a honeycomb core, a second layer of adhesive, and an uncured second laminate are all laid-up and the entire panel is co-cured in one operation. With a large cell carbon core panel, the large size of each cell of the core prohibits co-curing because the uncured laminates would sag into the cells, creating a permeable and/or dimpled panel. As such, large cell carbon core sandwich panels are manufactured using pre-cured laminates. Therefore, current large cell carbon core sandwich panels require a minimum of three cure cycles, one for each laminate and one for the whole panel. In addition, these three cure cycles also require three separate sets of tooling for laying up and curing the two laminates and the final panel. The intent of this disclosure is to define methods of co-curing the two laminates and the large cell core in one cure cycle while eliminating the sag, permeability, and/or dimpling of the laminates.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure provides a large cell carbon core sandwich panel and a method of manufacturing the same. The panel is generally manufactured by pressurizing the cells within the carbon core to prevent the laminates from sagging into the cells during the curing process. There are several different methods and structures that may facilitate pressurization of the large cell carbon core described below.

FIGS. 1-7. illustrate the components of a panel 100, according to this disclosure. Panel 100 includes a first laminate 102 with an outer surface 104, an inner surface 106, and a depth 108 measured therebetween. Opposite first laminate 102 is a second laminate 110 with an outer surface 112, an inner surface 114, and a depth 116 measured therebetween. Outer surface 104 of first laminate 102 and outer surface 112 of second laminate 110 are the faces of finished panel 100. First laminate 102 and second laminate 110 may be made of one or more layers of woven fiber sheets. For example, first laminate 102 and second laminate 110 may be made of several sheets of woven carbon fiber, fiberglass, or Kevlar. First laminate 102 and second laminate 110 may be pre-impregnated with resin or may have resin added thereto during panel construction. First laminate 102 and second laminate 110 may be different materials and depths 108,116 may be equal or unequal. Moreover, depths 108, 116 may vary along the length or width of panel 100.

Figure 1:
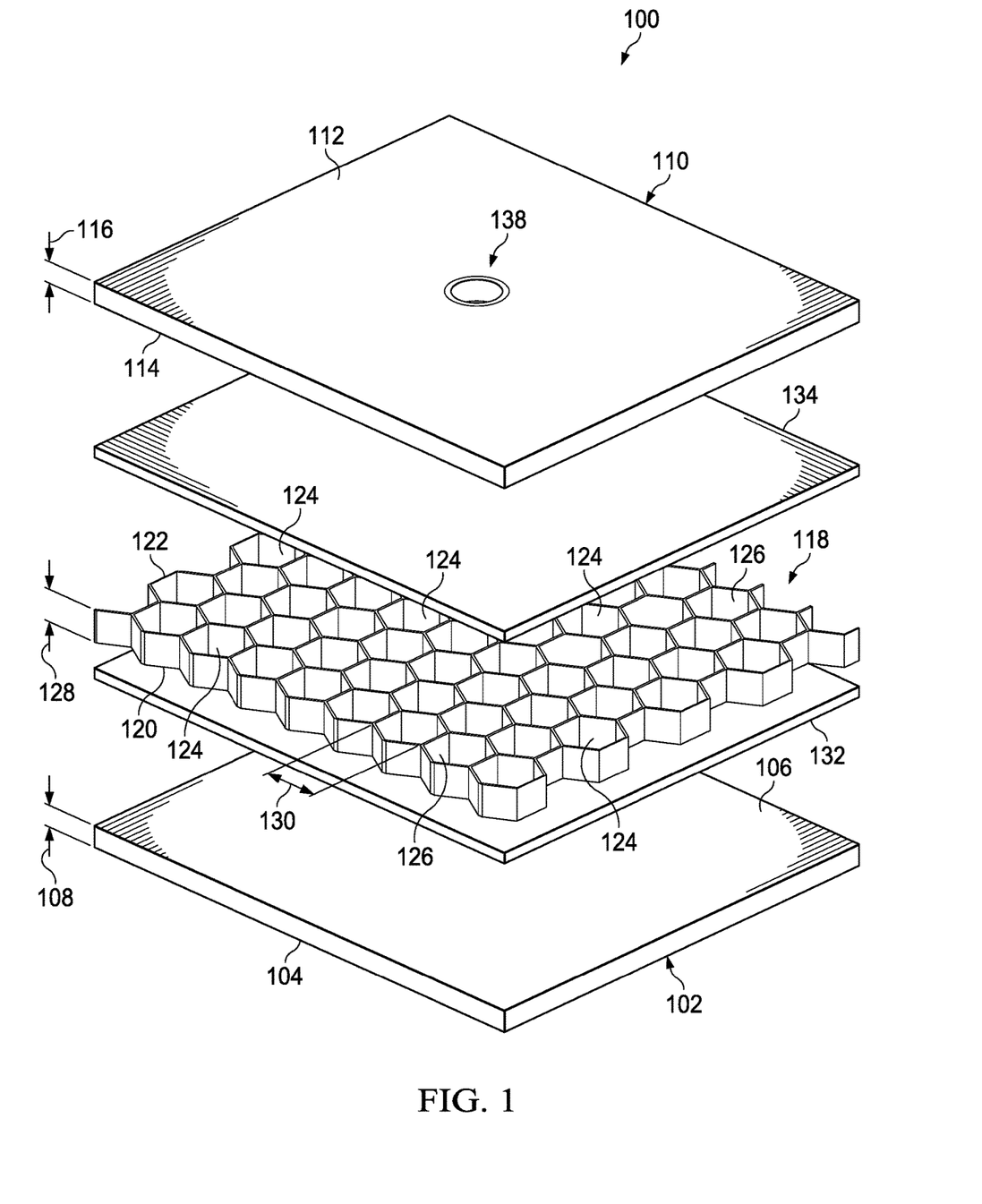
FIG. 1 is an oblique exploded view of components of a large cell carbon core sandwich panel, according to this disclosure.
Figure 3:
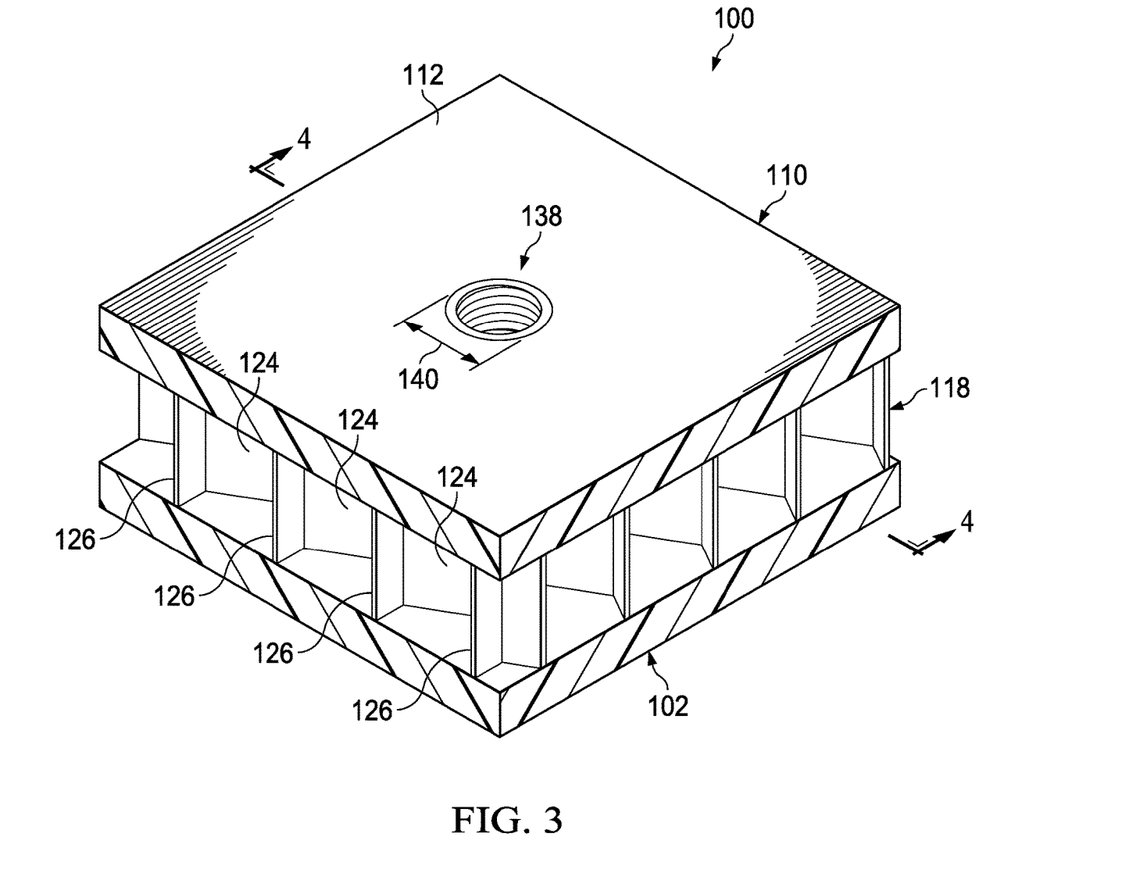
FIG. 3 is an oblique view of a portion of the large sell carbon core sandwich panel of FIG. 1.
Figure 4:
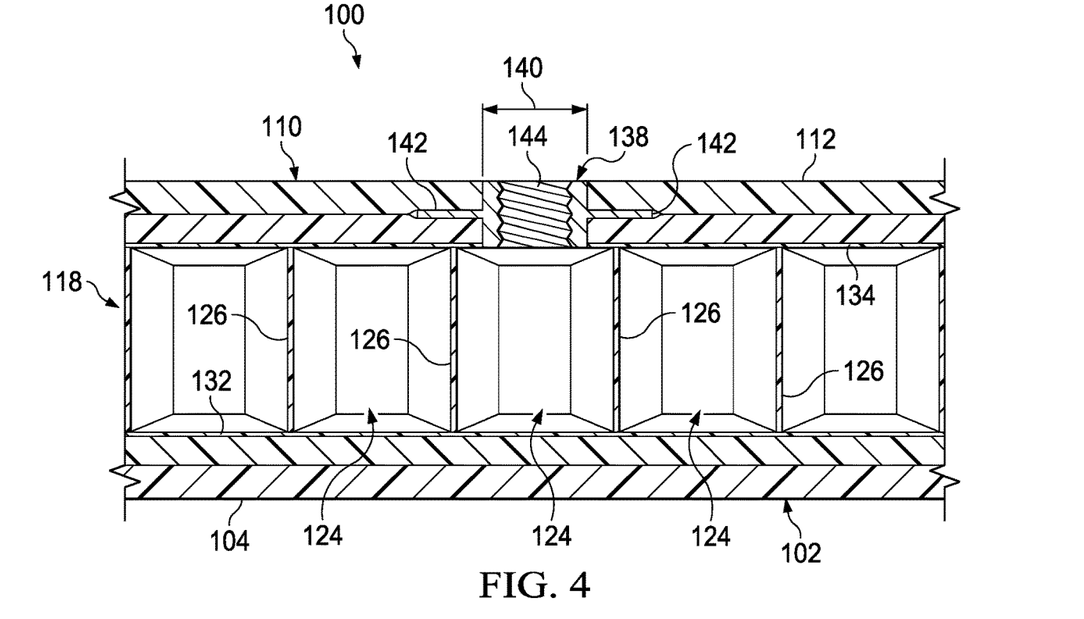
FIG. 4 is a cross-sectional side view of the large cell carbon core sandwich panel of FIG. 1.

The filling of sandwich panel 100 is a core 118. Large cell core 118 has a first side 120 facing first laminate 102 and a second side 122 facing second laminate 110. Core 118 defines a plurality of cells 124 extending from first side 120 to second side 122. Cells 124 are separated from each other by cell walls 126. Cell walls 126 are permeable so that gas introduced into one cell 124 may pass through cell wall 126 into an adjacent cell 124. Each cell 124 has a height 128 measured from first side 120 to second side 122 and a width 130 perpendicular to height 128. As core 118 is a large cell core, cells 124 preferably have cell widths 130 of at least ½ inch. Core 118 may be made of any material suitable for the intended purpose, for example, core 118 may be made of carbon fiber, fiberglass, Kevlar, aluminum, plastic, etc. Height 128 of cells 124 may be greater than depth 108 of first laminate 102 and depth 116 of second laminate 110. However, height 128 may be equal to, or less than, either or both depths 108, 116. Moreover, height 128 and width 130 may be variable along the length and width of panel 100. While shown as having a hexagonal cross-section, cells 124 may have any cross-sectional shape suitable for the intended purpose.

A first layer of thermoplastic 132 is located between inner surface 106 of first laminate 102 and first side 120 of core 118, and a second layer of thermoplastic 134 is located between inner surface 114 of second laminate 110 and second side 122 of core 118. First and second layers of thermoplastic 132, 134 also serve as the bonding agents adhering first and second laminates 102, 110 to core 118. First and second layers of thermoplastic 132, 134 may also function as vapor barriers of finished panel 100. First and second layers of thermoplastic 132, 134 may comprise polyetherimide (PEI) or Kapton, or any other material suitable for acting as a gas barrier and a bonding agent.

Figure 2:
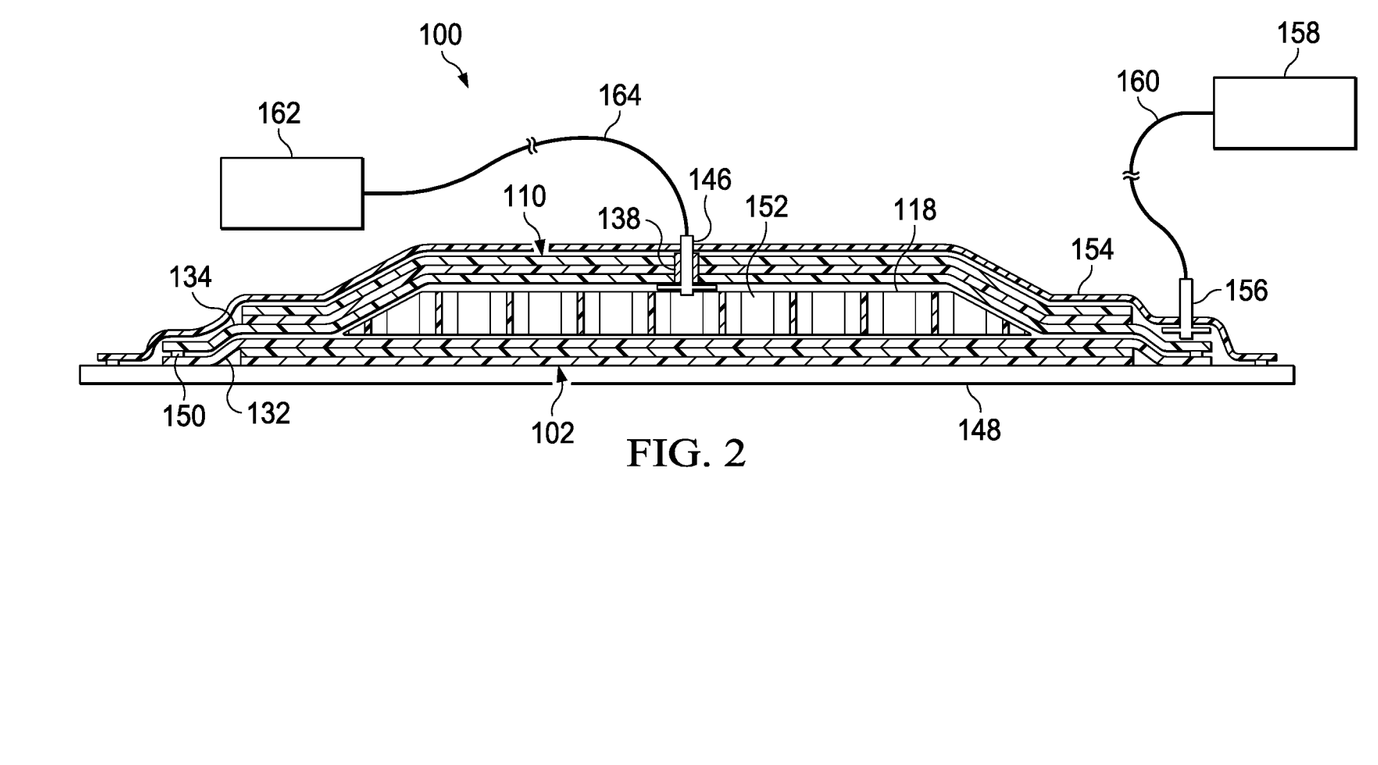
FIG. 2 is cross-sectional side view of a fabrication setup for manufacturing the large cell carbon core sandwich panel of FIG. 1.

Manufacturing panel 100 is facilitated by increasing the pressure within core 118 to provide a resistance force against inner surface 106 of first laminate 102 and inner surface 114 of second laminate 110 to prevent first and second laminates 102, 110 from sagging into cells 124 during the curing process. Pressure within core 118 may be increased by the introduction of a gas 136 through a port 138 extending from outer surface 112 to inner surface 114 of second laminate 110. Preferably, port 138 is centered over one of cells 124 and port 138 has a diameter 140 that is less than width 130 of cell 124 so that port 138 does not intersect with any of the cell walls 126, and therefore, port 138 does not affect the structural integrity of core 118. Port 138 may include a an annular flange 142 extending radially therefrom which may be positioned between the layers of fabric of second laminate 110. Port 138 may also include a threaded opening 144 therein to facilitate attachment of a nozzle 146 thereto for the introduction of gas 136. While the embodiment shown illustrates port 138 as an inserted structure, port 138 could simply be an opening created in second laminate 110 by moving fibers to allow nozzle 146 to be inserted through second laminate 110 into core 118.

The method of manufacturing panel 100 is illustrated in FIG. 2. First laminate 102 is laid-up on a tooling surface 148. First laminate 102 is then covered with first layer of thermoplastic 132. Core 118 is then placed on top of first layer of thermoplastic 132. Core 118 is then covered with second layer of thermoplastic 134 such that first layer of thermoplastic 132 and second layer of thermoplastic 134 are in contact with each other surrounding a perimeter of core 118. First layer of thermoplastic 132 is then bonded to second layer of thermoplastic around the entire perimeter of core 118 forming a seal 150. Seal 150 creates an airtight core pocket 152 between first layer of thermoplastic 132 and second layer of thermoplastic 134. Second laminate 110 is then placed on top of core pocket 152. It should be understood that core pocket 152 may be formed after second laminate 110 is placed on second layer of thermoplastic 134, as long as first layer of thermoplastic 132 and second layer of thermoplastic 134 extend beyond second laminate 110.

After the materials making up panel 100 are laid in position, they are covered with a vacuum bag 154 which is hermitically attached to tooling surface 148. A vacuum nozzle 156 is inserted through vacuum bag 154 and attached to a vacuum pump 158 via a vacuum hose 160. Before vacuum pump 158 is activated, nozzle 146 is inserted through port 138, piercing second layer of thermoplastic 134, into core pocket 152. Nozzle 146 is attached to an air compressor 162 by an air hose 164. Preferably, although not necessarily, vacuum pump 158 and air compressor 162 operate simultaneously to remove both the air from within vacuum bag 154, thereby increasing the pressure against outer surface 112 of second laminate 110, and to introduce gas 136 (air) into core pocket 152, thereby increasing the pressure within core pocket 152.

Figure 5:
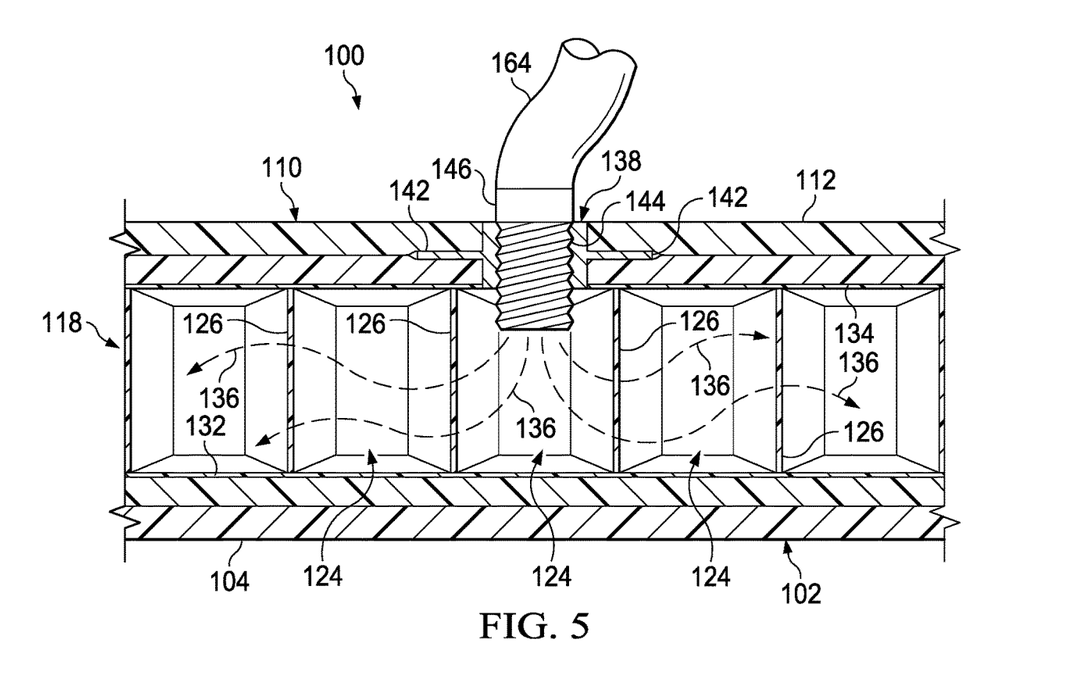
FIG. 5 is a cross-sectional side view of a portion of the manufacturing process of the large cell carbon core sandwich panel shown in FIG. 2.

As shown in FIG. 5, cell walls 126 of core 118 are preferably permeable and therefore, permit gas 136 to pass therethrough, allowing an even pressure throughout core pocket 152. Depending on the degree of permeability and dimensions of core 118, more than one port 138 may be required to provide substantially equal pressure throughout core pocket 152. The pressure generated within core pocket 152 should be less than or equal to the pressure applied to outer surface 112 of second laminate 110 by vacuum bag 154. Otherwise, the higher pressure within core pocket 152 may cause bulging of second laminate 110. Accordingly, the pressures within vacuum bag 154 and core pocket 152 should both be monitored throughout the curing process. In addition to being internally and externally pressurized, the materials comprising panel 100 should be heated to a desired curing temperature. Heating may be accomplished by placing the setup in an autoclave or an oven. It may be desired to embed temperature probes within panel 100 to monitor internal temperatures of panel 100 during the curing process. The desired internal and external pressures, as well as the desired curing temperature should be maintained for a desired curing duration.

Figure 6:
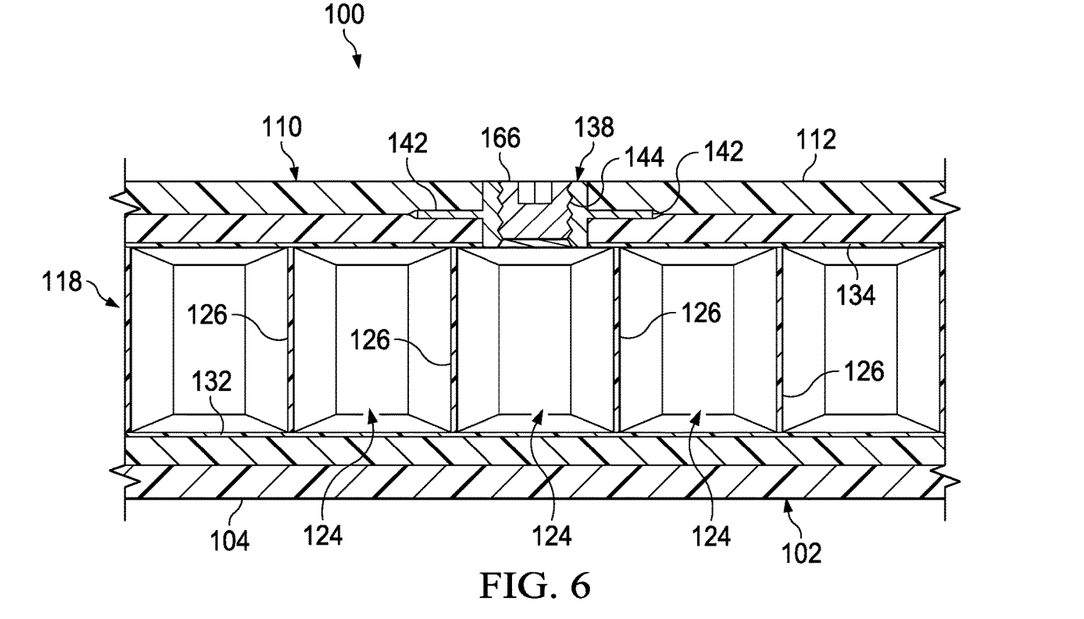
FIG. 6 is a cross-sectional side view of the large cell carbon core sandwich panel of FIG. 1 showing a port sealed with a port cap.
Figure 7:
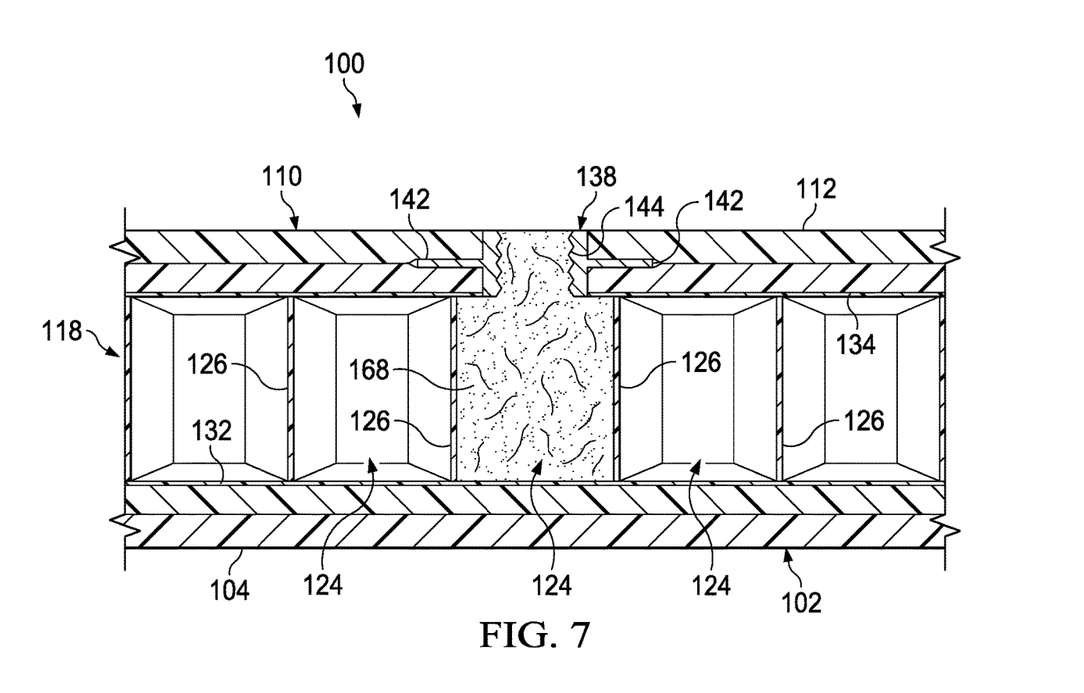
FIG. 7 is a cross-sectional side view of the large cell carbon core sandwich panel of FIG. 1 showing the port sealed with a sealant.

After curing is complete, and nozzle 146 is removed from port 138, it may be desired to seal off port 138. Sealing port 138 may be accomplished in a variety of ways. For example, as shown in FIG. 6, a threaded cap 166 may be inserted therein. Or, as shown in FIG. 7, port 138 and the adjoining cell 124 may be filled with a sealant 168. Sealant 168 may be a foam, epoxy, or resin filled with chopped fiber, or any other material suitable for sealing port 138. Moreover, port 138 may be removed completely and the resulting opening be patched over. Alternatively, port 138 may remain in place and be used as an anchor point for attaching equipment to panel 100.

Figure 8:
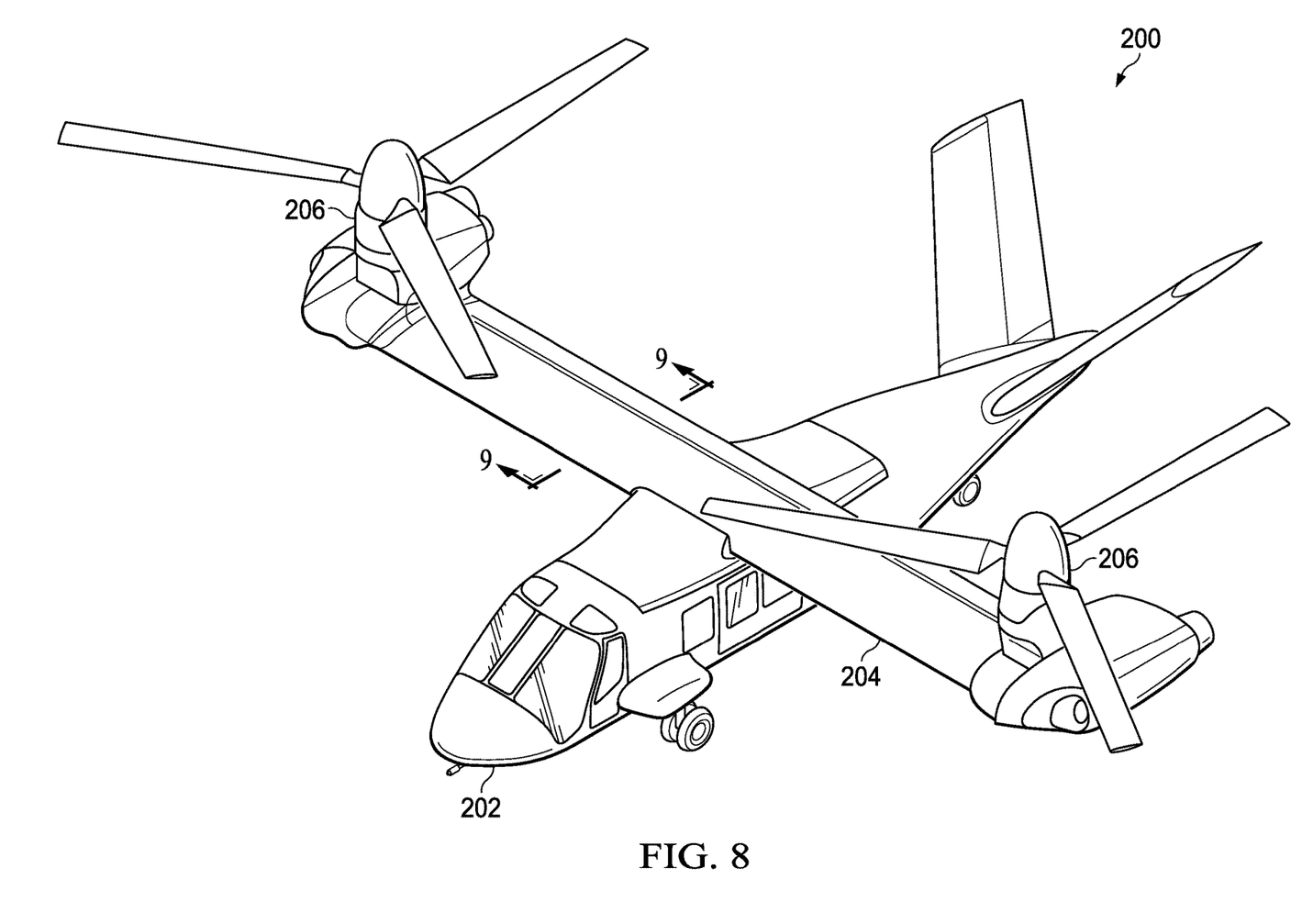
FIG. 8 is an oblique side view of an aircraft having a wing with skins made of large cell carbon core sandwich panels, according to this disclosure.
Figure 9:
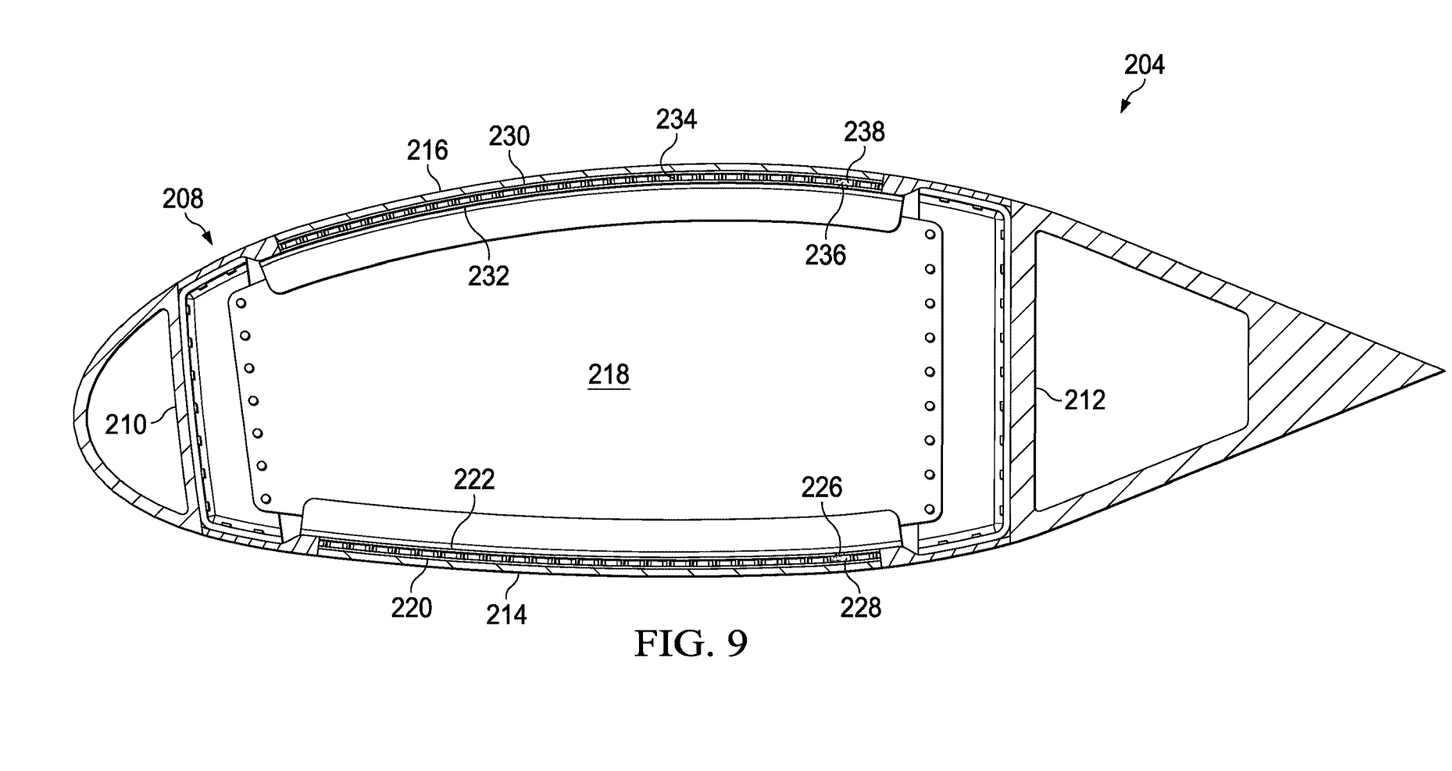
FIG. 9 is a cross-sectional side view of the wing of the aircraft of FIG. 8.

FIGS. 8 and 9 illustrate particularly advantageous uses of large cell core sandwich panels. FIG. 8 illustrates an aircraft 200 with a fuselage 202 and a wing 204 extending bilaterally from fuselage 202. Coupled to opposite ends of wing 204 are a pair of tiltrotors 206. Tiltrotors 206 are rotatable between a vertical, helicopter position, (as shown in FIG. 8) and a horizontal, airplane position. The varying forces transmitted from tiltrotors 206 through wing 204 to fuselage 202 require a robust wing structure with a high degree of torsional stiffness. Accordingly, as shown in FIG. 9, wing 204 includes a torque box 208 to resist the large forces. Torque box 208 includes a forward spar 210, an aft spar 212, a lower skin 214, an upper skin 216, and a plurality of ribs 218. Lower skin 214, upper skin 216, and rib 218 are all large cell carbon core sandwich panels cured in a single stage process by pressurizing the cores in accordance with the method described herein.

Lower skin 214 includes a first laminate 220 with an outer surface, an inner surface, and a depth measured therebetween. Opposite first laminate 220 is a second laminate 222 with an outer surface, an inner surface, and a depth measured therebetween. As shown, the depth of first laminate 220 is greater than the depth of second laminate 222. In between first laminate 220 and second laminate 222 is a core 224 bonded in place by a first layer of thermoplastic between first laminate 220 and core 224 and a second layer of thermoplastic between second laminate 222 and core 224. Lower skin 214 also includes a port 226 plugged with a sealant 228.

Upper skin 216 includes a first laminate 230 with an outer surface, an inner surface, and a depth measured therebetween. Opposite first laminate 230 is a second laminate 232 with an outer surface, an inner surface, and a depth measured therebetween. As shown, the depth of first laminate 230 is greater than the depth of second laminate 232. In between first laminate 230 and second laminate 232 is a core 234 bonded in place by a first layer of thermoplastic between first laminate 230 and core 234 and a second layer of thermoplastic between second laminate 232 and core 234. Upper skin 216 also includes a port 236 plugged with a sealant 238.

While the method of manufacturing panels described in this disclosure is particularly useful in manufacturing large cell sandwich panels, it is not so limited. The method described herein may be used to manufacture panels having cells of any size. In addition, formation of a core pocket that facilitates pressurization of core 118 may be created without the use of thermoplastics. For example, first and second laminates 102, 110 may undergo B-stage preparation prior to being laid-up. The partial curing of B-stage preparation may provide a sufficient seal to allow pressurization of the 118. Furthermore, pressurization of core pocket 152 may be accomplished by causing a chemical reaction that releases a gas within core pocket 152. Core pocket 152 may also be pressurized by filling core pocket 152 with a gas that has a high degree of thermal expansion when heated so that the gas in core pocket 152 expands when the setup is placed in the autoclave.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A panel, comprising:
    a first laminate having an outer surface, an inner surface, and a depth extending from the outer surface to the inner surface;
    a core having a first side and an opposite second side, the core defining a plurality of cells extending from the first side to the opposite second side, each cell being separated from each adjacent cell by a permeable cell wall, each cell having a height measured from the first side to the opposite second side and a width perpendicular to the height, the width of each cell being at least ½ of an inch;
    a first layer of thermoplastic located between, and bonded to, the inner surface of the first laminate and the first side of the core;
    a second laminate having an outer surface, an inner surface, and a depth extending from the outer surface to the inner surface; and
    a second layer of thermoplastic located between, and bonded to, the inner surface of the second laminate and the opposite second side of the core;
    wherein one of the first laminate or the second laminate includes a port extending from the outer surface to the inner surface thereof and wherein the port and an associated one of the plurality of cells is filled with sealant.

2. The panel of claim 1, wherein the port has a diameter that is less than the width of one of the cells.

3. The panel of claim 2, wherein the port is positioned over a single one of the cells so the port does not intersect with any of the cell walls.

4. The panel of claim 2, wherein the port includes a threaded opening.

5. The panel of claim 4, further comprising a cap sealing the port.

6. The panel of claim 5, wherein the height of the cells is greater than the depth of the first laminate and the depth of the second laminate.

7. The panel of claim 6, wherein the depth of the first laminate is different than the depth of the second laminate.

* * * * *